US010827781B2

(12) United States Patent
Chen et al.

(10) Patent No.: US 10,827,781 B2
(45) Date of Patent: Nov. 10, 2020

(54) SMOKING DEVICE AND METHOD OF CONTROLLING THE SAME (71) Applicant: Smiss Technology Co., Ltd., Shenzhen (CN)

(72) Inventors: Jiatai Chen, Shenzhen (CN); Zhonghu Xu, Shenzhen (CN); Shikai Chen, Shenzhen (CN)

(73) Assignee: Smiss Technology Co., Ltd. (CN)

( * ) Notice: Subject to any disclaimer, the term of this patent is extended or adjusted under 35 U.S.C. 154(b) by 277 days.

(21) Appl. No.: 15/955,006

(22) Filed: Apr. 17, 2018

(65) Prior Publication Data
US 2019/0183178 A1 Jun. 20, 2019

(30) Foreign Application Priority Data

Dec. 18, 2017 (CN) .......................... 2017 1 1364782

(51) Int. Cl.
A24F 40/40 (2020.01)
A24F 40/42 (2020.01)
G05D 23/30 (2006.01)
G05D 23/24 (2006.01)
G05D 23/19 (2006.01)

(52) U.S. Cl.
CPC .............. A24F 40/40 (2020.01); A24F 40/42 (2020.01); G05D 23/1927 (2013.01); G05D 23/24 (2013.01); G05D 23/303 (2013.01)

(58) Field of Classification Search
CPC ................................................... A24F 47/008
USPC ........................................................ 131/329
See application file for complete search history.

(56) References Cited

U.S. PATENT DOCUMENTS

| | | | | |
|---|---|---|---|---|
| 2008/0092912 | A1* | 4/2008 | Robinson | A24B 3/14 131/200 |
| 2015/0068543 | A1* | 3/2015 | Liu | A24F 47/002 131/329 |
| 2015/0305409 | A1* | 10/2015 | Verleur | H02J 7/0022 131/329 |
| 2016/0022930 | A1* | 1/2016 | Greim | A61M 15/06 131/328 |
| 2016/0198771 | A1* | 7/2016 | Goggin | A24F 47/008 131/329 |
| 2019/0022345 | A1* | 1/2019 | Kotch | A61M 16/145 |

* cited by examiner

Primary Examiner — Michael J Felton
(74) Attorney, Agent, or Firm — Lerner, David, Littenberg, Krumholz & Mentlik, LLP (57) ABSTRACT A smoking device includes a first heating assembly, a second heating assembly, and an electric control assembly. The first heating assembly has a receiving chamber used to receive a substance to be heated, and the first heating assembly is used to heat the substance to be heated. The second heating assembly has an airflow passage being in communication with the outside, the airflow passage is in communication with the receiving chamber so as to allow outside air to enter the receiving chamber through the airflow passage, and the second heating assembly is configured to heat the air entering the airflow passage. The electric control assembly is electrically connected to both heating assemblies to control heating operations of the heating assemblies, such that when the smoking device is working, at least one of the first heating assembly and the second heating assembly performs the heating operations.

13 Claims, 7 Drawing Sheets

SMOKING DEVICE AND METHOD OF CONTROLLING THE SAME

CROSS-REFERENCED TO RELATED APPLICATIONS

The present application claims priority from Chinese Patent Application No. 201711364782.7, filed on Dec. 18, 2017, the disclosure of which is hereby incorporated herein by reference.

TECHNICAL FIELD

The present disclosure relates to a smoking device and a method of controlling the same.

BACKGROUND OF THE INVENTION

The heating mode of the conventional vaping is single, which can not meet the various requirements of the user for the amount of vapor, and the single heating mode has problems of insufficient heating supply and low heating efficiency in the low-temperature and cold environment.

SUMMARY OF THE INVENTION

According to various embodiments of the present disclosure, a smoking device is provided, which can meet various requirements of the user for the amount of vapor and has higher heating efficiency.

In addition, a method of controlling a smoking device is provided.

A smoking device includes:

a first heating assembly having a receiving chamber used to store a substance to be heated, the first heating assembly can heat the substance to be heated;

a second heating assembly having an airflow passage being in communication with the outside, the airflow passage being in communication with the receiving chamber so as to allow outside air to enter the receiving chamber through the airflow passage, the second heating assembly can heat the air entering the airflow passage; and an electric control assembly electrically connected to both the first heating assembly and the second heating assembly, the electric control assembly is used to control heating operations of the first heating assembly and the second heating assembly, such that when the smoking device is working, at least one of the first heating assembly and the second heating assembly performs the heating operations.

Since the first heating assembly 100 of the aforementioned smoking device can heat the substance to be heated in the receiving chamber 110, so as to directly heat the substance to be heated, thereby achieving conductive heating. The second heating assembly 200 can heat the air entering the airflow passage 210. The airflow passage 210 of the second heating assembly 200 communicating with the outside is in communication with the receiving chamber 110 of the first heating assembly 100, so as to allow outside air to enter the receiving chamber 110 through the airflow passage 210. Therefore, the heating air heated by the second heating assembly 200 can enter the receiving chamber 110 to heat the substance to be heated, thereby achieving airflow heating. Since the electric control assembly 300 can control heating operations of the first heating assembly 100 and the second heating assembly 200 such that when the smoking device is working, at least one of the first heating assembly and the second heating assembly performs the heating operations. In addition, when the smoking device is working, the first heating assembly 100 and the second heating assembly 200 can separately perform the heating operations, what's more, the first heating assembly 100 and the second heating assembly 200 can also simultaneously perform the heating operations. Therefore, the smoking device can be customized to achieve conduction heating mode, the airflow heating mode, or hybrid heating mode of the conduction heating and the airflow heating according to users' requirements, thereby meeting the various requirements of the users for the amount of smoke. At the same time, since the smoking device can achieve that the first heating assembly 100 and the second heating assembly 200 simultaneously perform the heating operations, i.e., achieving the hybrid heating mode of the conduction heating and the airflow heating, such that the heat supply can be guaranteed by implementing the hybrid heating mode in the cold and low temperature environment, and the heating efficiency can be improved.

According to an embodiment, the electric control assembly is used to control the heating operations of the first heating assembly and the second heating assembly, such that the smoking device is in a first working mode, a second working mode, a third working mode, or a fourth working mode;

in the first operation mode, the electric control assembly controls the first heating assembly to separately perform a heating operation, and a heating temperature of the first heating assembly can be adjusted;

in the second operation mode, the electric control assembly controls the second heating assembly to separately perform a heating operation, and the heating temperature of the second heating assembly can be adjusted;

in the third operation mode, the electric control assembly controls the first heating assembly and the second heating assembly to simultaneously perform the heating operations, and the heating temperatures of the first heating assembly and the second heating assembly can be simultaneously adjusted according to a preset adjustment amplitude; and in the fourth operation mode, the electric control assembly controls the first heating assembly and the second heating assembly to simultaneously perform the heating operations, and the heating temperatures of the first heating assembly and the second heating assembly can be adjusted separately.

According to an embodiment, in the third operation mode, when the electric control assembly controls the heating temperature of the first heating assembly to rise, the electric control assembly controls the heating temperature of the second heating assembly to drop at the same time.

According to an embodiment, the smoking device further includes a first temperature sensor and a second temperature sensor, the first temperature sensor and the second temperature sensor are both electrically connected to the electric control assembly, the first temperature sensor can detect a temperature of the first heating assembly and convert the temperature of the first heating assembly into a signal and transmit the signal to the electric control assembly, and the second temperature sensor can detect a temperature of the second heating assembly and convert the temperature of the second heating assembly into a signal and transmit the signal to the electric control assembly.

According to an embodiment, the smoking device further includes a plurality of Teflon sleeves, some of the Teflon sleeves is fixedly sleeved on the first temperature sensor and the first heating assembly, so as to fix the first temperature sensor onto the first heating assembly, and the other part of the Teflon sleeves is fixedly sleeved on the second temperature sensor and the second heating assembly, so as to fix the second temperature sensor onto the second heating assembly.

According to an embodiment, the smoking device further includes a displayer electrically connected to the electric control assembly, the displayer can display working information of the first heating assembly and the second heating assembly, and can also display temperatures of the first heating assembly and the second heating assembly.

According to an embodiment, the first heating assembly includes a heating cartridge, the heating cartridge is a ceramic heating body, and the heating cartridge is electrically connected to the electric control assembly, such that the electric control assembly can control a heating operation of the heating cartridge, one end of the heating cartridge is open, the other end of the heating cartridge is provided with an air inlet, the air inlet is in communication with the airflow passage, an inner chamber of the heating cartridge is the receiving chamber.

According to an embodiment, the second heating assembly includes a tubular member and a heating member, one end of the tubular member is connected to the heating cartridge and is in communication with the air inlet, the other end of the tubular member is in communication with the outside, the heating member is fixedly received in the tubular member, and the heating member is electrically connected to the electric control assembly, such that the electric control assembly can control a heating operation of the heating member, and the inner chamber of the tubular member is the airflow passage.

According to an embodiment, the heating cartridge has a bottom wall, the air inlet is located on the bottom wall, and the bottom wall is further provided with an annular portion circling the air inlet, the smoking device further includes a connecting assembly including a connecting member and a silicone sleeve, the connecting member includes a tubular body and a flange formed on an end of the tubular body, one end of the tubular body away from the flange is fixedly sleeved on an end of the tubular member near the heating cartridge and is in communication with both the tubular member and the air inlet, the silicone sleeve is sleeved on the flange, and a portion of the silicone sleeve is received in the annular portion and hermetically abuts against the heating cartridge, such that the heating cartridge is hermetically connected to the tubular member.

According to an embodiment, the smoking device further includes a fixing assembly, the fixing assembly includes a sealing sleeve, a first fixing member, a second fixing member, and a connecting cartridge, the sealing sleeve is sleeved on an end of the heating cartridge away from the tubular member, the first fixing member is fixedly sleeved on the sealing sleeve, such that the sealing sleeve is tightly sandwiched between the tubular member and the first fixing member, the second fixing member is sleeved on an end of the tubular member away from the heating cartridge, the second fixing member is provided with a vent hole communicating with the outside, the vent hole is in communication with the airflow passage, the connecting cartridge is sleeved on the sealing sleeve and the tubular member, one end of the connecting cartridge is sleeved on the second fixing member, the other end of the connecting cartridge is fixedly connected to the sealing sleeve, such that the connecting cartridge is fixedly sandwiched between the sealing sleeve and the second fixing member.

According to an embodiment, the sealing sleeve includes a cylindrical portion and an annular stopper portion fixedly provided in the cylindrical portion, the end of the heating cartridge away from the tubular member is received in the cylindrical portion and abuts against the annular stopper portion, the first fixing member is fixedly sleeved on the cylindrical portion, such that the cylindrical portion is tightly sandwiched between the heating cartridge and the first fixing member.

According to an embodiment, the smoking device includes an air guiding tube, one end of the air guiding tube is sleeved on the second fixing member and is in communication with the vent hole, and the other end of the air guiding tube is in communication with the outside.

A method of controlling a smoking device, includes steps in the following:

control information is received;

at least one of airflow heating and conduction heating is performed according to the control information.

According to an embodiment, the smoking device includes a first heating assembly, a second heating assembly, and an electric control assembly, the first heating assembly has a receiving chamber used to receive a substance to be heated, and the first heating assembly can heat the substance to be heated, the second heating assembly has an airflow passage being in communication with the outside, the airflow passage is in communication with the receiving chamber to allow outside air to enter the receiving chamber through the airflow passage, and the second heating assembly can heat the air entering the airflow passage, the electric control assembly is electrically connected to both the first heating assembly and the second heating assembly, the electric control assembly is used to control heating operations of the first heating assembly and the second heating assembly;

The step of performing the at least one of airflow heating and conduction heating according to the control information includes:

at least one of the second heating assembly and the first heating assembly is controlled by the electric control assembly to perform the heating operations.

According to an embodiment, performing the airflow heating and the conduction heating according to the control information, such that the smoking device is in a first working mode, a second working mode, a third working mode, or a fourth working mode;

in the first operation mode, performing the conduction heating and adjusting a heating temperature of the conduction heating;

in the second operation mode, performing the airflow heating and adjusting a heating temperature of the airflow heating;

in the third operation mode, simultaneously performing the airflow heating and the conduction heating, and simultaneously adjusting heating temperatures of the airflow heating and the conduction heating according to the preset adjustment amplitude; and in the fourth operation mode, simultaneously performing the airflow heating and the conduction heating, and adjusting the heating temperatures of the airflow heating and the conduction heating separately according to the preset adjustment amplitude.

According to an embodiment, in the third operation mode, when the heating temperature of the conduction heating is controlled to rise according to the control information and the heating temperature of the airflow heating is controlled to drop at the same time.

DETAILED DESCRIPTION OF THE EMBODIMENTS

Embodiments of the present disclosure are described more fully hereinafter with reference to the accompanying drawings, in which some embodiments of the present disclosure are shown. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

It will be understood that when an element is referred to as being "fixed" to another element, it can be directly coupled to the other element or intervening elements can be present. When an element is referred to as being "coupled" to another element, it can be directly coupled or intervening elements can also be present. It will be understood that, although the terms vertical, horizontal, left, right and similar expressions can be used herein to describe various elements, these terms are only used for representation.

Unless otherwise defined, all terms (including technical and scientific terms) used herein have the same meaning as commonly understood by one of ordinary skill in the art to which this invention belongs. It will be further understood that the terms used herein the specification are for the purpose of describe detailed embodiments only, and are not intended to limit the present disclosure.

Figure 1:
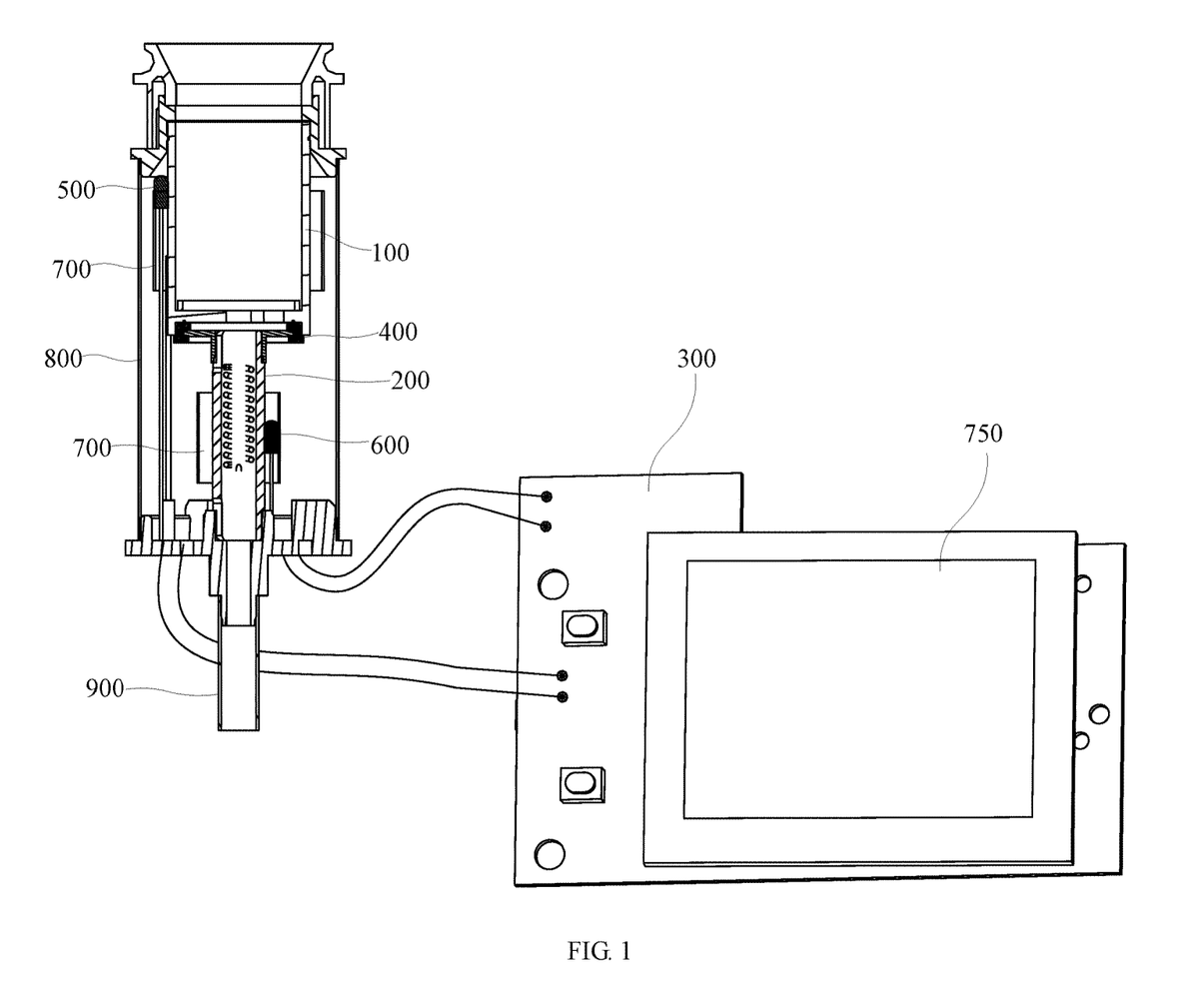
FIG. 1 is a partial cross-sectional view of a smoking device according to an embodiment.

Referring to FIG. 1, a smoking device (not shown) of an embodiment comprises a first heating assembly 100, a second heating assembly 200, and an electric control assembly 300. The first heating assembly 100 is used to be connected to a electronic cigarette mouthpiece (not shown) and is used to store a substance to be heated. The second heating assembly 200 is in communication with the outside and the first heating assembly 100. The electric control assembly 300 is used to supply power to the first heating assembly 100 and the second heating assembly 200 to enable the first heating assembly 100 and the second heating assembly 200 to perform heating operations. The substance to be heated may be tobacco leaves, 'tobacco tar', etc., and the 'tobacco tar' may be solid 'tobacco tar' (wax) or liquid 'tobacco tar' (e-liquid).

Figure 2:
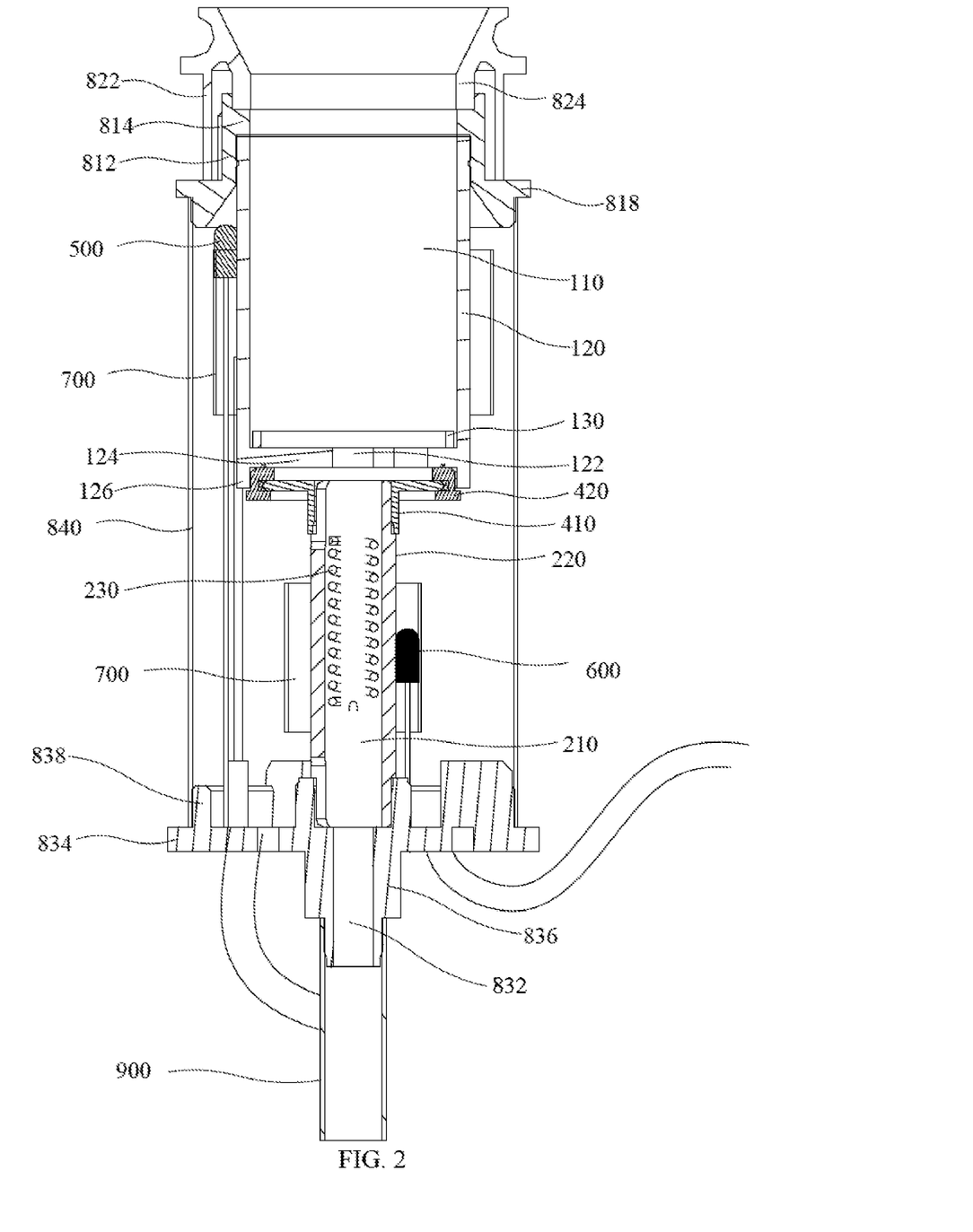
FIG. 2 is a cross-sectional view of the smoking device shown in FIG. 1 with an electric control assembly and a displayer omitted.

Referring to FIG. 2 together, the first heating assembly 100 has a receiving chamber 110 used to store the substance to be heated, and the first heating assembly 100 can heat the substance to be heated. Specifically, the first heating assembly 100 includes a heating cartridge 120 and a filter screen 130.

One end of the heating cartridge 120 is open, the other end of the heating cartridge 120 is provided with an air inlet 122, i.e., the substance to be heated can be received in the heating cartridge 120. The open end of the heating cartridge 120 can communicate with the electronic cigarette mouthpiece.

Specifically, the heating cartridge 120 is a ceramic heating body, such as an alumina ceramic heater, a zirconia ceramic heater, and so on. It should be noted that the heating cartridge 120 is not limited to be the ceramic heating body, and the heating cartridge 120 may be a metal cylinder or the like.

The filter screen 130 is fixedly received in the heating cartridge 120 and shields the air inlet 122 to prevent the substance to be heated in the heating cartridge 120 from leaking from the air inlet 122.

Furthermore, the first heating assembly 100 further includes a supporting member (not shown). The supporting member is fixedly received in the heating cartridge 120, and the supporting member is used to carry the substance to be heated so as to carry the tobacco tar. Specifically, the supporting member can be a wire cake, ceramic honeycomb material and the like.

It should be noted that the supporting member may be omitted. In this case, the heating cartridge 120 may only be used to receive the tobacco leaves.

The second heating assembly 200 has an airflow passage 210 being in communication with the outside. The airflow passage 210 is in communication with the receiving chamber 110 to allow outside air to enter the receiving chamber 110 through the airflow passage 210. The second heating assembly 200 can heat the air entering the airflow passage 210, i.e., the airflow passage 210 is in communication with the air inlet 122. The second heating assembly 200 includes a tubular member 220 and a heating member 230.

One end of the tubular member 220 is connected to the heating cartridge 120 and is in communication with the air inlet 122, the other end of the tubular member 220 is in communication with the outside, and an inner chamber of the tubular member 220 is the airflow passage 210. The tubular member 220 is a metal tube. Since diameter of the tubular member 220 is small, the machining precision of the tubular member 220 made of metal is high, the stable connection of the smoking device is easy to be achieved. Furthermore, the tubular member 220 is an aluminum tube being light in texture, which is beneficial for reducing the weight of the smoking device.

Referring to FIGS. 3 to 6 together, specifically in the illustrated embodiment, the heating cartridge 120 has a bottom wall 124 opposite to the open end. The air inlet 122 is located on the bottom wall 124, and the bottom wall 124 of the heating cartridge 120 is provided with an annular portion 126 circling the air inlet 122. The smoking device further includes a connecting assembly 400 including a connecting member 410 and a silicone sleeve 420. The connecting member 410 includes a tubular body 412 and a flange 414 formed on an end of the tubular body 412. One end of the tubular body 412 away from the flange 414 is fixedly sleeved on an end of the tubular member 220 near the heating cartridge 120 and is in communication with both the tubular member 220 and the air inlet 120. The silicone sleeve 420 is sleeved on the flange 414, and a portion of the silicone sleeve 420 is received in the annular portion 126 and hermetically abuts against the heating cartridge 120, such that the heating cartridge 120 is hermetically connected to the tubular member 220. By using the silicone sleeve 420, not only the sealing connection between the heating cartridge 120 and the tubular member 220 can be achieved, but also the thermal insulation effect on the heating cartridge 120 and the tubular member 220 can be achieved. The air inlet 122 is located in the middle of the bottom wall 124.

Specifically, the connecting member 410 is made of metal. Furthermore, the connecting member 410 is made of aluminum. The tubular body 412 of the connecting member 410 is in interference fit with the tubular member 220.

It should be noted that the heating cartridge 120 is not limited to the above structure. For example, the heating cartridge 120 has no bottom wall 124, and the heating cartridge 120 is a cartridge opening at both ends. In this case, one opening of the heating cartridge 120 is connected to the electronic cigarette mouthpiece, and the other opening is the air inlet 122. The manner of connecting the heating cartridge 120 and the tubular member 220 is not limited to the above. For example, the heating cartridge 120 and the tubular member 220 may be directly fixed together.

The heating member 230 is fixedly received in the tubular member 220 and can heat the air entering the tubular member 220. Specifically in the illustrated embodiment, the heating member 230 is a heating wire.

The electric control assembly 300 is an electric control part of the entire smoking device. The electric control assembly 300 is electrically connected to both the first heating assembly 100 and the second heating assembly 200, such that the electric control assembly 300 can separately supply power to the first heating assembly 100 and the second heating assembly 200 to enable the first heating assembly 100 and the second heating assembly 200 to have heating function. The electric control assembly 300 is used to control heating operations of the first heating assembly 100 and the second heating assembly 200, such that when the smoking device is working, at least one of the first heating assembly 100 and the second heating assembly 200 performs the heating operation. Specifically, both the heating cartridge 120 and the heating member 230 are electrically connected to the electric control assembly 300, such that the electric control assembly 300 can supply power to the heating cartridge 120 and the heating member 230. The electric control assembly 300 can control heating operations of the heating cartridge 120 and the heating member 230, such that when the smoking device is working, at least one of the heating cartridge 120 and the heating member 230 performs the heating operation. In order to enable at least one of the heating cartridge 120 and the heating member 230 to perform the heating operation, the heating cartridge 120 and the heating member may be disposed in parallel.

Specifically, the electric control assembly 300 is used to control the heating operations of the first heating assembly 100 and the second heating assembly 200, such that the smoking device is in a first working mode, a second working mode, a third working mode, or a fourth working mode;

In the first operation mode, the electric control assembly 300 controls the first heating assembly 100 to separately perform a heating operation, and a heating temperature of the first heating assembly 100 can be adjusted. The electric control assembly 300 supplies power to the heating cartridge 120 of the first heating assembly, but doesn't supply power to the heating member 230 of the second heating assembly. The substance to be heated is only heated by the heating cartridge 120, and the user can adjust the heating temperature of the heating cartridge 120 according to the requirements, which is a conduction heating mode and can meet the users' requirement for rapid smoke removal.

In the second operation mode, the electric control assembly 300 controls the second heating assembly 200 to separately perform a heating operation, and a heating temperature of the second heating assembly 200 can be adjusted. The electric control assembly 300 supplies power to heating member 230, but doesn't supply power to the heating cartridge 120. The heating member 230 heats the airflow entering the tubular member 220. The heated air enters the heating cartridge 120, and heats the substance to be heated in the heating cartridge 120. The users can adjust the heating temperature of the heating member 230 according to the requirements, which is an airflow heating mode and can meet the users' requirement for slowly smoking.

In the third operation mode, the electric control assembly 300 controls the first heating assembly 100 and the second heating assembly 200 to simultaneously perform the heating operations, and the heating temperatures of the first heating assembly 100 and the second heating assembly 200 can be simultaneously adjusted according to a preset adjustment amplitude. The electric control assembly 300 supplies power to both heating member 230 and the heating cartridge 120. The heating air heated by the heating member 230 and the heating cartridge 120 simultaneously supplies heat to the substance to be heated in the heating cartridge 120. This is a hybrid heating mode, which can meet the requirements of the users for great smoke. In this mode, the heating temperatures of the heating member 230 and the heating cartridge 120 are simultaneously adjusted according to the preset adjustment amplitude.

Specifically, in the third operation mode, when the electric control assembly 300 controls the heating temperature of the first heating assembly 100 to rise, the electric control assembly 300 controls the heating temperature of the second heating assembly 200 to drop at the same time. It should be noted that the second heating assembly 200 and the first heating assembly 100 are not limited to the above mode in the third operation mode. The electric control assembly 300 may control the heating temperature of the first heating assembly 100 to rise, and controls the heating temperature of the second heating assembly 200 to rise at the same time.

The preset adjustment amplitude may be, for example, a plurality of preset adjustment gradients. At each gradient, the heating cartridge 120 and the heating member 230 have corresponding heating temperatures. For example, as shown in Table 1, it is assumed that the heating temperature of the heating cartridge 120 is from 140° to 220°, and the heating temperature of the heating member 230 is from 220° C. to 256° C. The heating temperature controlled by the electric control assembly 300 is divided into 100 adjusting gradients, and 1% is an adjusting gradient. Each gradient is configured to correspond to temperatures of the specific heating cartridge 120 and the specific heating member 230. For example, when the gradient is 10%, the heating temperature of the corresponding heating cartridge 120 is 140° C., and the heating temperature of the corresponding heating member 230 is 256° C.

TABLE 1

| Gradients (%) | Heating temperature of the heating cartridge 120 (° C.) | Heating temperature of the heating member 230(° C.) |
| --- | --- | --- |
| 10 | 140 | 256 |
| 15 | 145 | 254 |
| 20 | 150 | 252 |
| 25 | 155 | 250 |
| 30 | 160 | 248 |
| 35 | 165 | 246 |
| 40 | 170 | 244 |
| 45 | 175 | 242 |
| 50 | 180 | 240 |
| 55 | 184 | 238 |

TABLE 1-continued

| Gradients (%) | Heating temperature of the heating cartridge 120 (° C.) | Heating temperature of the heating member 230(° C.) |
| --- | --- | --- |
| 60 | 188 | 236 |
| 65 | 192 | 234 |
| 70 | 196 | 232 |
| 75 | 200 | 230 |
| 80 | 204 | 228 |
| 85 | 208 | 226 |
| 90 | 212 | 224 |
| 95 | 216 | 222 |
| 100 | 220 | 220 |

In the fourth operation mode, the electric control assembly 300 controls the first heating assembly 100 and the second heating assembly 200 to simultaneously perform the heating operations, and the heating temperatures of the first heating assembly 100 and the second heating assembly 200 can be separately adjusted. This is the hybrid heating mode. The electric control assembly 300 supplies power to both heating member 230 and the heating cartridge 120. The heating air heated by the heating member 230 and the heating cartridge 120 simultaneously supplies heat to the substance to be heated in the heating cartridge 120. However, the difference between this operation mode and the third operation mode is that the heating temperature of the heating member 230 and the heating cartridge 120 can be separately adjusted. For example, both the heating member 230 and the heating cartridge 120 are in a non-polar adjustment mode, and the user can separately adjust the heating temperature of heating cartridge 120 and the heating temperature of the heating member 230 according to the requirements. In this mode, any adjustment within the heating temperature ranges of the heating cartridge 120 and the heating member 230 can be achieved.

Specifically, the electric control assembly 300 includes a central processing module (not shown) and an integrated circuit module (not shown) electrically connected to the central processing module. The central processing module is used to control the power supply and information processing of the entire smoking device. The central processing module may be, for example, a Single-chip microcomputer of STMicroelectronics. The integrated circuit module is electrically connected to the heating cartridge 120 of the first heating assembly 100 and the heating member 230 of the second heating assembly 200. The integrated circuit module is used to realize the electrical connection between the components and the central processing module. The integrated circuit module may be, for example, a MC95FG308H power control module integrated circuit manufactured by Korea's Hyundai.

Figure 5:
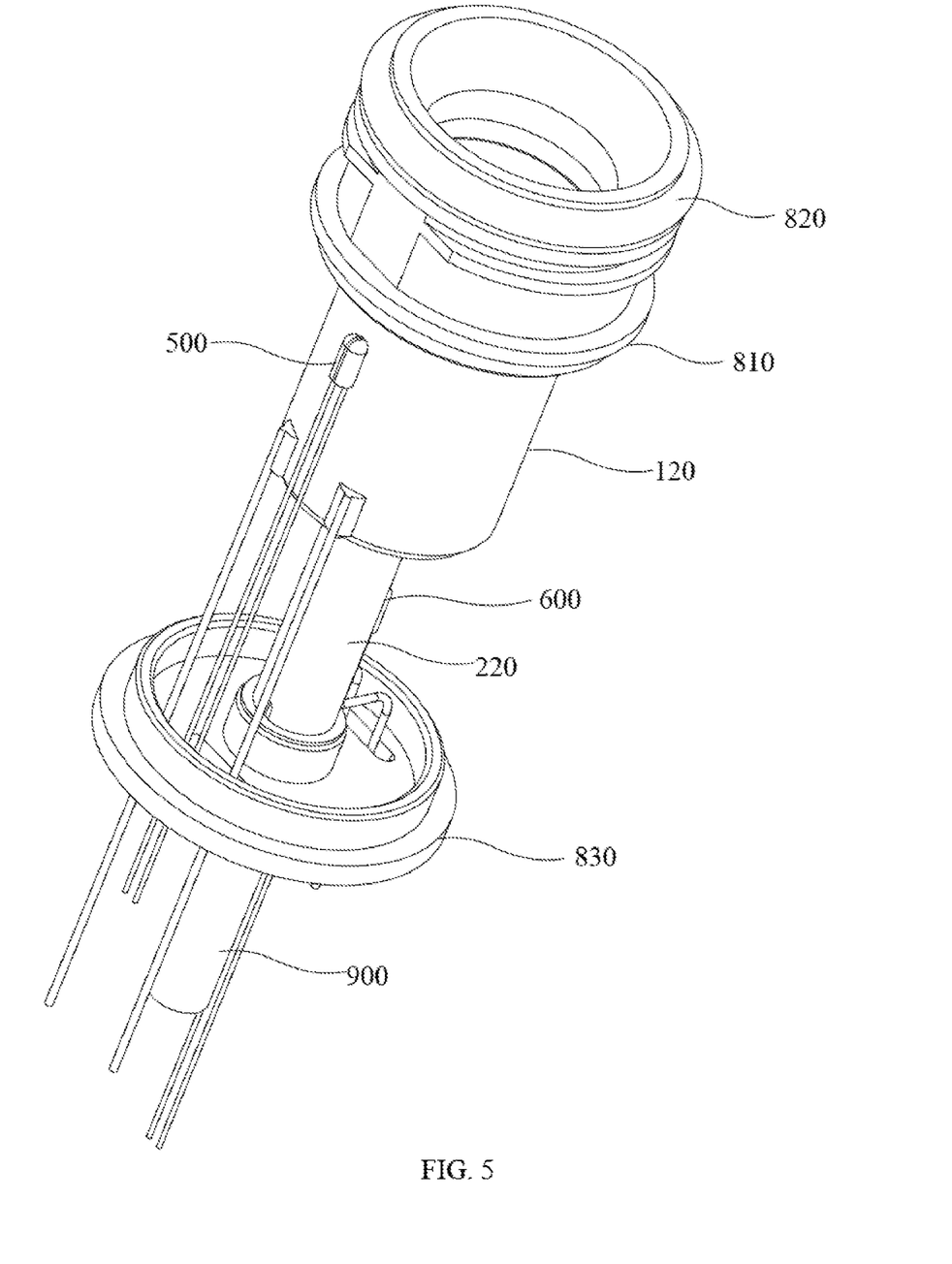
FIG. 5 is a schematic view of the smoking device shown in FIG. 2 with a connecting cartridge and a Teflon sleeve omitted.
Figure 6:
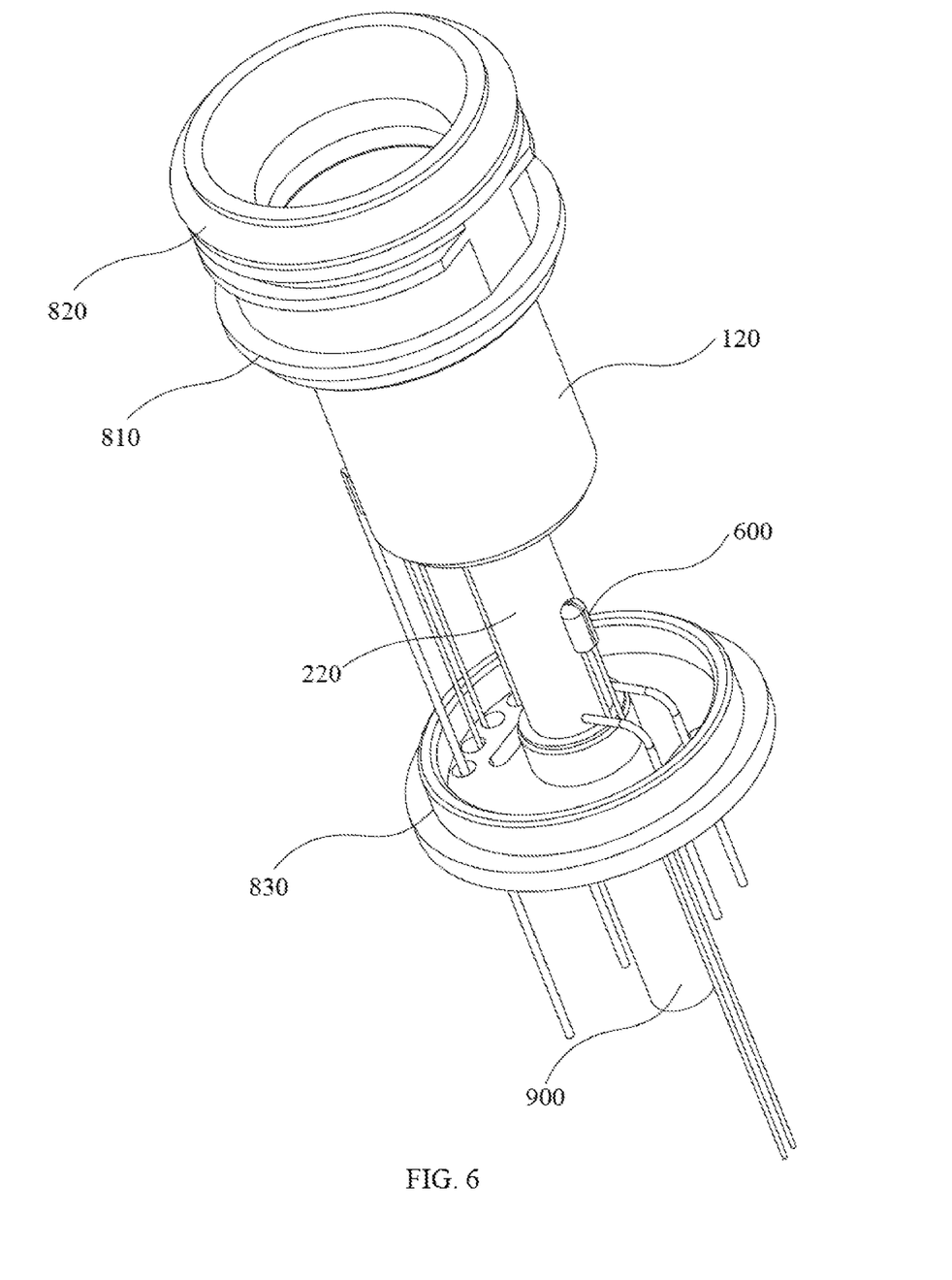
FIG. 6 is a schematic view of another angle of the smoking device shown in FIG. 5.

Furthermore, the smoking device further includes a first temperature sensor 500 and a second temperature sensor 600. The first temperature sensor 500 and the second temperature sensor 600 are both electrically connected to the electric control assembly 300. The first temperature sensor 500 can detect a temperature of the heating cartridge 120 of the first heating assembly 100 and convert the temperature of the heating cartridge 120 of the first heating assembly 100 into a signal, and transmit the signal to the electric control assembly 300. The second temperature sensor 600 can detect a temperature of the tubular member 220 of the second heating assembly 200 and convert the temperature of the tubular member 220 of the second heating assembly 200 into a signal, and transmit the signal to the electric control assembly 300. Specifically, the first temperature sensor 500 is fixed on an outer wall of the heating cartridge 120; the second temperature sensor 600 is fixed on an outer wall of the tubular member 220.

Figure 3:
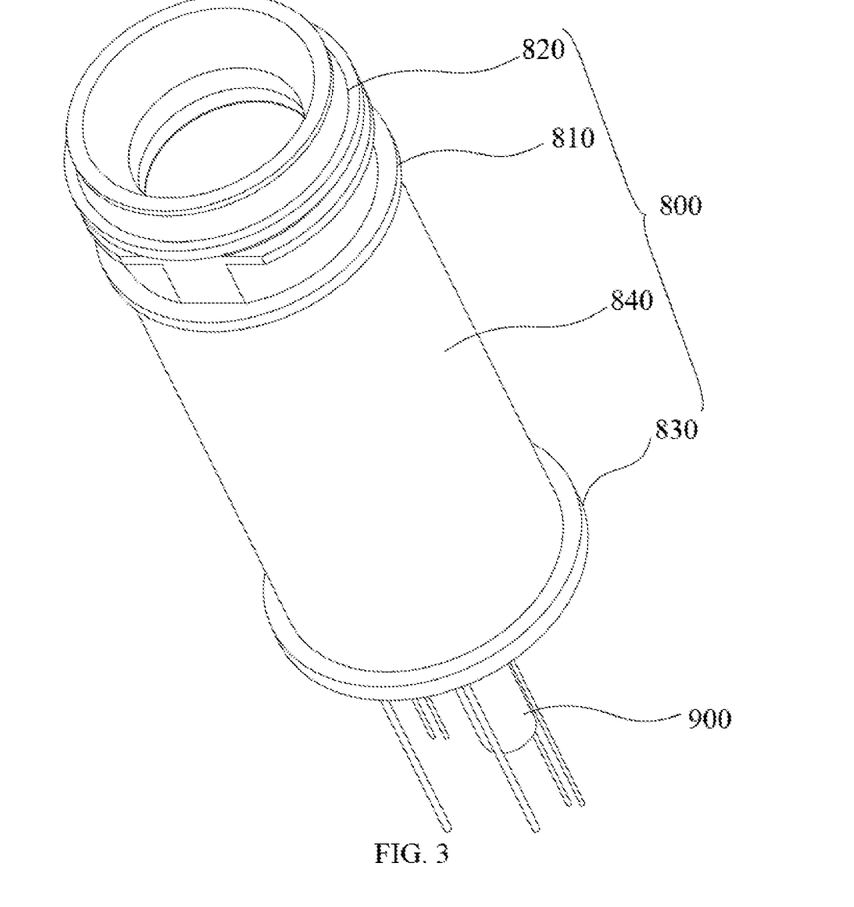
FIG. 3 is a schematic view of the smoking device shown in FIG. 2.
Figure 4:
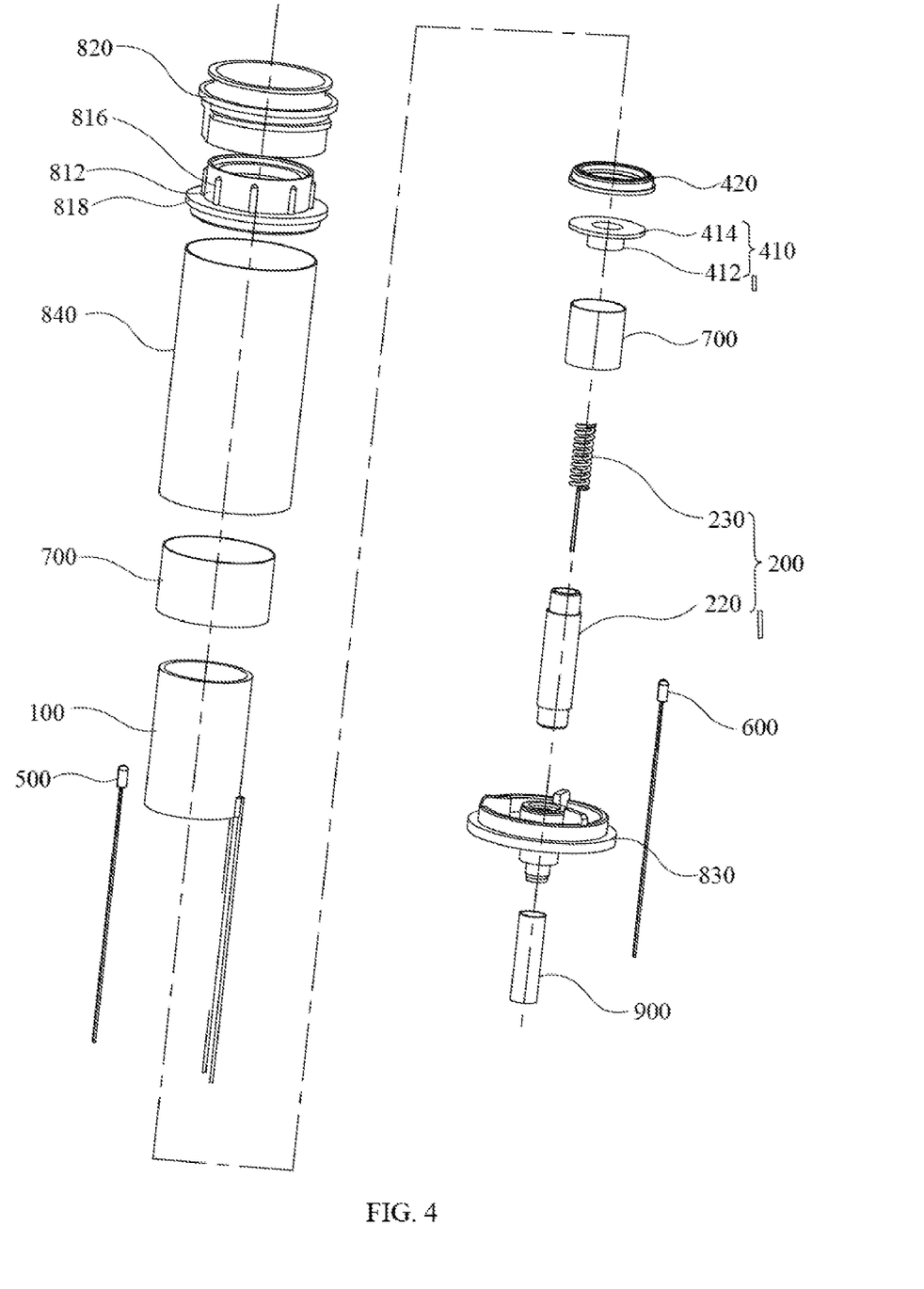
FIG. 4 is an exploded view of the smoking device shown in FIG. 3.

Furthermore, the smoking device further includes a plurality of Teflon sleeves 700, some of the Teflon sleeves 700 are fixedly sleeved on the first temperature sensor 500 and the heating cartridge 120, so as to fix the first temperature sensor 500 onto the heating cartridge 120. The other part of the Teflon sleeves are fixedly sleeved on the second temperature sensor 600 and the tubular member 220, so as to fix the second temperature sensor 600 on the tubular member 220. The Teflon sleeve 700 is resistant to high temperatures, and the usage of the Teflon sleeve 700 makes it easy to fix the first temperature sensor 500 onto the heating cartridge 120 and fix the second temperature sensor 600 onto the tubular member 220.

Specifically, the first temperature sensor 500 and the second temperature sensor 600 are both a thermistor sensor, for example, a PT3-25E2-1 thermistor sensor manufactured by Japan's Chi Pu, a working temperature range of which is within 500° C.

Furthermore, the smoking device further includes a displayer 750 electrically connected to the electric control assembly 300. The displayer 750 can display working information of the first heating assembly 100 and the second heating assembly 200, and can also display temperatures of the first heating assembly 100 and the second heating assembly 200. Specifically, the displayer 750 can display working information and temperature of the heating cartridge 120 and the tubular member 220. Specifically, the working information includes a heating current, a working condition and so on. It should be understood that the displayer 750 may also be omitted, and it is not necessary to display the temperature of the heating cartridge 120 and the tubular member 220, and the working information of the heating barrel 120 and the heating member 230.

Furthermore, the smoking device further includes a fixing assembly 800. The fixing assembly 800 is used to fixedly connect the first heating assembly 100 and the second heating assembly 200. Specifically, the fixing assembly 800 includes a sealing sleeve 810, a first fixing member 820, a second fixing member 830, and a connecting cartridge 840.

The sealing sleeve 810 is sleeved on an end of the heating cartridge 120 away from the tubular member 220. Specifically, the sealing sleeve 810 is made of silicone.

Specifically, the sealing sleeve 810 includes a cylindrical portion 812 and an annular stopper portion 814 fixedly provided in the cylindrical portion. The end of the heating cartridge 120 away from the tubular member 220 is received in the cylindrical portion 812 and abuts against the annular stopper portion 814, so as to define the position after the heating cartridge 120 and the sealing sleeve 810 are installed.

The first fixing member 820 is connected to the electronic cigarette mouthpiece. The first fixing member 820 is fixedly sleeved on the sealing sleeve 810, such that the sealing sleeve 810 is tightly sandwiched between the tubular member 220 and the first fixing member 820, and the sealing sleeve 810 separates the heating cartridge 120 and the first fixing member 820. Specifically, the first fixing member 820 is fixedly sleeved on the cylindrical portion 812 of the sealing sleeve 810, such that the cylindrical portion 812 is tightly sandwiched between the heating cartridge 120 and the first fixing member 820. More specifically, the first fixing member 820 is substantially in the shape of a cylinder with two ends open. One end of the first fixing member 820 is fixedly sleeved on the cylindrical portion 812, and the other end of the first fixing member 820 can be connected to the electronic cigarette mouthpiece.

Furthermore, the first fixing member 820 includes a cylindrical fixing portion 822 with two ends open and an annular limiting portion 824 fixedly disposed in the fixing portion 822. One end of the fixing portion 822 is sleeved on the cylindrical portion 812 of the sealing sleeve 810, such that the cylindrical portion 812 is tightly sandwiched between the fixing portion 822 and the heating cartridge 120. The limiting portion 824 abuts against the side of the annular stopper portion 814 away from the heating cartridge 120. The limiting portion 824 and the heating cartridge 120 abut against the opposite sides of the annular stopper portion 814, respectively. The end of the fixing portion 822 away from the sealing sleeve 810 can be connected to the electronic cigarette mouthpiece.

Furthermore, a plurality of abutting protrusions 816 are intervally provided on the outer wall of the cylindrical portion 812 and circling the cylindrical portion 812. The first fixing member 820 abuts against the plurality of abutting protrusions 816. The fixing portion 822 abuts against the abutting protrusion 816. Specifically, the abutting protrusion 816 is strip-shaped, and the extending directions of the plurality of abutting protrusions 816 are all parallel to the axial direction of the cylindrical portion 812.

Furthermore, the sealing sleeve 810 further includes an annular abutting portion 818 provided around the cylindrical portion 812, and the fixing portion 822 of the first fixing member 820 abuts against the annular abutting portion 818. Specifically, each abutting protrusion 816 extends from one end near the cylindrical portion 812 to be connected to the annular abutting portion 818.

The second fixing member 830 is sleeved on an end of the tubular member 220 away from the heating cartridge 120, the second fixing member 830 is provided with a vent hole 832 communicating with the outside, the vent hole 832 is in communication with the airflow passage 210.

Specifically, the second fixing member 830 includes a plate-shaped body 834, a columnar connecting portion 836, and an annular connecting portion 838. The columnar connecting portion 836 fixedly drills through the plate-shaped body 834. The annular connecting portion 838 is fixed on one side of the plate-shaped body 834 and circling the columnar connecting portion 836. The vent hole 832 is provided on the columnar connecting portion 836, and the vent hole 832 extends from one end of the columnar connecting portion 836 to the other end thereof. The end of the tubular member 220 away from the heating cartridge 120 is sleeved on one end of the columnar connecting portion 836, and abuts against the side of the plate-shaped body 834 on which the annular connecting portion 838 is formed. Specifically, the tubular member 220 is in interference fit with the columnar connecting portion 836.

The connecting cartridge 840 is sleeved on the sealing sleeve 810 and the tubular member 220. One end of the connecting cartridge 840 is sleeved on the second fixing member 830, the other end of the connecting cartridge 840 is fixedly connected to the sealing sleeve 810, such that the connecting cartridge 840 is fixedly sandwiched between the sealing sleeve 810 and the second fixing member 830. Therefore, the connecting member 410, the sealing sleeve 810, the first fixing member 820, and the second fixing member 830, cooperatively and fixedly connect the heating cartridge 120, the tubular member 220, and the connecting assembly 400. Specifically, one end of the connecting cartridge 840 is tightly sleeved on the cylindrical portion 812 of the sealing sleeve 810, and abuts against the annular abutting portion 818. The other end of the connecting cartridge 840 is fixedly sleeved on the annular connecting portion 838 and abuts against the plate-shaped body 834. More specifically, both the connecting barrel 840 and the annular connecting portion 838 are in interference fit.

Furthermore, the smoking device includes an air guiding tube 900. One end of the air guiding tube 900 is sleeved on the second fixing member 830 and is in communication with the vent hole 832. The other end of the air guiding tube 900 is in communication with the outside. Specifically, the end of the air guiding tube 900 is fixedly sleeved on one end of the columnar connecting portion 836 away from the tubular member 220. It should be noted that the air guiding tube 900 may also be omitted.

The aforementioned smoking device has at least the following advantages:

(1) Since the first heating assembly 100 of the aforementioned smoking device can heat the substance to be heated in the receiving chamber 110, so as to directly heat the substance to be heated, thereby achieving conductive heating. The second heating assembly 200 can heat the air entering the airflow passage 210. The airflow passage 210 of the second heating assembly 200 communicating with the outside is in communication with the receiving chamber 110 of the first heating assembly 100, so as to allow outside air to enter the receiving chamber 110 through the airflow passage 210. Therefore, the heating air heated by the second heating assembly 200 can enter the receiving chamber 110 to heat the substance to be heated, thereby achieving airflow heating. Since the electric control assembly 300 can control heating operations of the first heating assembly 100 and the second heating assembly 200, such that when the smoking device is working, at least one of the first heating assembly 100 and the second heating assembly 200 performs the heating operations. In addition, when the smoking device is working, the first heating assembly 100 and the second heating assembly 200 can separately perform the heating operations, what's more, the first heating assembly 100 and the second heating assembly 200 can also simultaneously perform the heating operations. Therefore, the smoking device can be customized to achieve conduction heating mode, the airflow heating mode, or hybrid heating mode of the conduction heating and the airflow heating according to user requirements, thereby meeting the various requirements of the user for the amount of smoke.

(2) At the same time, since the smoking device can achieve that the first heating assembly 100 and the second heating assembly 200 simultaneously perform the heating operations, i.e., achieving the hybrid heating mode of the conduction heating and the airflow heating, such that the heat supply can be guaranteed by implementing the hybrid heating mode in the cold and low temperature environment, and the heating efficiency can be improved. The air inlet 122 is provided in the middle portion of the bottom wall 124, the air heated by the tubular member 220 can directly contact with a middle portion of the substance to be heated in the receiving chamber 110. Therefore, a central position of the substance to be heated (especially the tobacco leaves) can be heated, such that the substance to be heated can be more fully heated and the utilization of the substance to be heated can be increased.

(3) The aforementioned smoking device can achieve the aforementioned four heating modes, so that the users can separately control the first heating assembly 100 to work, and adjust the temperature as required. The users can separately control the second heating assembly 200 to work, and adjust the temperature as required. The users can control the first heating assembly 100 and the second heating assembly 200 to work simultaneously, and adjust the heating temperatures of the first heating assembly 100 and the second heating assembly 200 according to the preset adjustment amplitude. The users can control the first heating assembly 100 and the second heating assembly 200 to simultaneously perform the heating operation, and separately adjust the heating temperatures of the first heating assembly 100 and the second heating assembly 200 according to the requirements, so as to enable the users to adjust the heating mode of the smoking device according to personal preferences, and to better meet the user's requirements.

(4) By setting the first temperature sensor 500 and the second temperature sensor 600 for detecting the temperatures of the first heating assembly 100 and the second heating assembly 200, respectively, the heating temperatures of the first heating assembly 100 and the second heating assembly 200 can be better controlled.

(5) By setting the connecting assembly 400 between the heating cartridge 120 and the tubular member 220, the heating cartridge 120, the connecting assembly 400, and the tubular member 220 are connected by the fixing assembly 800, so that not only the heating cartridge 120 of the ceramic heating body can be reliably connected to the tubular member 220, but also the sealed connection between the heating cartridge 120 and the tubular member 220 can be achieved. Therefore, the structure is more compact and the installation is convenient. In addition, the sealing sleeve 810 in the fixing assembly 800 is made of silicone, which can not only have the effect of insulating heat transfer between the first fixing member 820 and the heating cartridge 120, but also the sealed connection between the first fixing member 820 and the heating cylinder 120 can be achieved.

It should be noted that the second heating assembly 200 is not limited to be the aforementioned structure, for example, the tubular member 220 of the second heating assembly 200 may be the ceramic heating body. In this case, the heating member 230 may be omitted, and the tubular member 220 may be directly and electrically connected to the electric control assembly 300.

Figure 7:
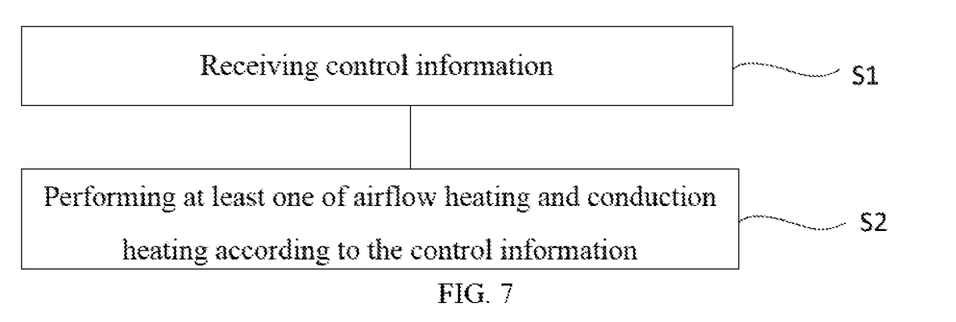
FIG. 7 is a flowchart of a method of controlling a smoking device according to an embodiment.

Referring to FIG. 7 together, a method of controlling a smoking device according to an embodiment is a method of controlling the aforementioned smoking device. The method of controlling the aforementioned smoking device includes the following steps:

In step S1, control information is received.

Specifically, the control information may be input directly by setting a button, a knob, or directly touching the displayer 900.

In step S2, at least one of airflow heating and conduction heating is performed according to the control information.

Specifically, the electric control assembly 300 controls at least one of the first heating assembly and the second heating assembly to perform heating operations according to the control information. More specifically, the electric control assembly 300 controls at least one of the heating member 230 and heating cartridge 120 to perform heating operations according to the control information.

The airflow heating and the conduction heating is performed according to the control information, such that the smoking device is in a first working mode, a second working mode, a third working mode, or a fourth working mode;

In the first operation mode, the conduction heating is performed and a heating temperature of the conduction heating is adjusted.

In the second operation mode, the airflow heating is performed and a heating temperature of the airflow heating is adjusted.

In the third operation mode, the airflow heating and the conduction heating are simultaneously performed, and the heating temperatures of the airflow heating and the conduction heating are simultaneously adjusted according to the preset adjustment amplitude.

Furthermore, in the third operation mode, when the heating temperature of the conduction heating is controlled to rise according to the control information, and the heating temperature of the airflow heating is simultaneously controlled to drop. It should be noted that the third operation mode is not limited to be the above mode. When the heating temperature of the conduction heating is controlled to rise according to the control information, the heating temperature of the airflow heating can be controlled to rise, simultaneously.

In the fourth operation mode, the airflow heating and the conduction heating are simultaneously performed, and the heating temperatures of the airflow heating and the conduction heating are separately adjusted according to the preset adjustment amplitude.

The four working modes are as described above, which is not described herein again.

The method of controlling the smoking device can achieve the four heating modes, so as to enable the users to adjust the heating mode of the smoking device according to personal preferences, and to better meet the users' requirements.

The different technical features of the above embodiments can have various combinations which are not described for the purpose of brevity. Nevertheless, to the extent the combining of the different technical features does not conflict with each other, all such combinations must be regarded as within the scope of the disclosure.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall within the protection scope of the present disclosure. Therefore, the protection scope of the present disclosure shall be subject to the protection scope of the claims.

What is claimed is:

1. A smoking device comprising:
   a first heating assembly having a receiving chamber configured to store a substance to be heated, wherein the first heating assembly can heat the substance to be heated;
   a second heating assembly having an airflow passage being in communication with the outside, the airflow passage being in communication with the receiving chamber so as to allow outside air to enter the receiving chamber through the airflow passage, wherein the second heating assembly can heat the air entering the airflow passage;
   an electric control assembly electrically connected to both the first heating assembly and the second heating assembly, wherein the electric control assembly is configured to control heating operations of the first heating assembly and the second heating assembly, such that when the smoking device is working, at least one of the first heating assembly and the second heating assembly performs the heating operations;

the first heating assembly comprises a heating cartridge, the heating cartridge is a ceramic heating body, and the heating cartridge is electrically connected to the electric control assembly, such that the electric control assembly can control a heating operation of the heating cartridge, one end of the heating cartridge is open, the other end of the heating cartridge is provided with an air inlet, the air inlet is in communication with the airflow passage, an inner chamber of the heating cartridge is the receiving chamber;

the second heating assembly comprises a tubular member and a heating member, one end of the tubular member is connected to the heating cartridge and is in communication with the air inlet, the other end of the tubular member is in communication with the outside, the heating member is fixedly received in the tubular member, and the heating member is electrically connected to the electric control assembly, such that the electric control assembly can control a heating operation of the heating member, and an inner chamber of the tubular member is the airflow passage; and a fixing assembly, wherein the fixing assembly comprises a sealing sleeve, a first fixing member, a second fixing member, and a connecting cartridge, wherein the sealing sleeve is sleeved on an end of the heating cartridge away from the tubular member, the first fixing member is fixedly sleeved on the sealing sleeve, such that the sealing sleeve is tightly sandwiched between the tubular member and the first fixing member, the second fixing member is sleeved on an end of the tubular member away from the heating cartridge, the second fixing member is provided with a vent hole communicating with the outside, the vent hole is in communication with the airflow passage, the connecting cartridge is sleeved on the sealing sleeve and the tubular member, one end of the connecting cartridge is sleeved on the second fixing member, the other end of the connecting cartridge is fixedly connected to the sealing sleeve, such that the connecting cartridge is fixedly sandwiched between the sealing sleeve and the second fixing member.

2. The smoking device of claim 1, wherein the electric control assembly is configured to control the heating operations of the first heating assembly and the second heating assembly, such that the smoking device is in a first working mode, a second working mode, a third working mode, or a fourth working mode;

in the first operation mode, the electric control assembly controls the first heating assembly to separately perform a heating operation, and a heating temperature of the first heating assembly can be adjusted;

in the second operation mode, the electric control assembly controls the second heating assembly to separately perform a heating operation, and a heating temperature of the second heating assembly can be adjusted;

in the third operation mode, the electric control assembly controls the first heating assembly and the second heating assembly to simultaneously perform the heating operations, and the heating temperatures of the first heating assembly and the second heating assembly can be simultaneously adjusted according to a preset adjustment amplitude; and in the fourth operation mode, the electric control assembly controls the first heating assembly and the second heating assembly to simultaneously perform the heating operations, and the heating temperatures of the first heating assembly and the second heating assembly can be adjusted, separately.

3. The smoking device of claim 2, wherein in the third operation mode, when the electric control assembly controls the heating temperature of the first heating assembly to rise, the electric control assembly controls the heating temperature of the second heating assembly to drop at the same time.

4. The smoking device of claim 1, further comprising a first temperature sensor and a second temperature sensor, wherein the first temperature sensor and the second temperature sensor are both electrically connected to the electric control assembly, the first temperature sensor can detect a temperature of the first heating assembly and convert the temperature of the first heating assembly into a signal, and transmit the signal to the electric control assembly, the second temperature sensor can detect a temperature of the second heating assembly and convert the temperature of the second heating assembly into a signal, and transmit the signal to the electric control assembly.

5. The smoking device of claim 4, further comprising a plurality of Teflon sleeves, some of the Teflon sleeves being fixedly sleeved on the first temperature sensor and the first heating assembly, so as to fix the first temperature sensor onto the first heating assembly, and the other part of the Teflon sleeves being fixedly sleeved on the second temperature sensor and the second heating assembly, so as to fix the second temperature sensor onto the second heating assembly.

6. The smoking device of claim 1, further comprising a displayer electrically connected to the electric control assembly, wherein the displayer can display working information of the first heating assembly and the second heating assembly, and can also display temperatures of the first heating assembly and the second heating assembly.

7. The smoking device of claim 1, wherein the heating cartridge has a bottom wall, the air inlet is located on the bottom wall, and the bottom wall is further provided with an annular portion circling the air inlet, the smoking device further comprises a connecting assembly comprising a connecting member and a silicone sleeve, the connecting member comprises a tubular body and a flange formed on an end of the tubular body, one end of the tubular body away from the flange is fixedly sleeved on an end of the tubular member near the heating cartridge and is in communication with both the tubular member and the air inlet, the silicone sleeve is sleeved on the flange, and a portion of the silicone sleeve is received in the annular portion and hermetically abuts against the heating cartridge, such that the heating cartridge is hermetically connected to the tubular member.

8. The smoking device of claim 1, wherein the sealing sleeve comprises a cylindrical portion and an annular stopper portion fixedly provided in the cylindrical portion, the end of the heating cartridge away from the tubular member is received in the cylindrical portion and abuts against the annular stopper portion, the first fixing member is fixedly sleeved on the cylindrical portion, such that the cylindrical portion is tightly sandwiched between the heating cartridge (heating chamber) and the first fixing member.

9. The smoking device of claim 1, further comprising an air guiding tube, wherein one end of the air guiding tube is sleeved on the second fixing member and is in communication with the vent hole, and the other end of the air guiding tube is in communication with the outside.

10. A method of controlling a smoking device, comprising steps in the following:

receiving control information;

performing at least one of airflow heating and conduction heating according to the control information.

11. The method of controlling the smoking device of claim 10, wherein the smoking device comprises a first heating assembly, a second heating assembly, and an electric control assembly, the first heating assembly has a receiving chamber configured to receive a substance to be heated, and the first heating assembly can heat the substance to be heated, the second heating assembly has an airflow passage being in communication with the outside, the airflow passage is in communication with the receiving chamber to allow outside air to enter the receiving chamber through the airflow passage, and the second heating assembly can heat the air entering the airflow passage, the electric control assembly is electrically connected to both the first heating assembly and the second heating assembly, the electric control assembly is configured to control heating operations of the first heating assembly and the second heating assembly;

wherein the step of performing the at least one of airflow heating and conduction heating according to the control information comprises:

controlling, by the electric control assembly, at least one of the second heating assembly and the first heating assembly to perform the heating operations.

12. The method of controlling the smoking device of claim 10, wherein the performing the airflow heating and the conduction heating according to the control information, such that the smoking device is in a first working mode, a second working mode, a third working mode, or a fourth working mode;

in the first operation mode, performing the conduction heating and adjusting a heating temperature of the conduction heating;

in the second operation mode, performing the airflow heating and adjusting a heating temperature of the airflow heating;

in the third operation mode, simultaneously performing the airflow heating and the conduction heating, and simultaneously adjusting heating temperatures of the airflow heating and the conduction heating according to the preset adjustment amplitude; and in the fourth operation mode, simultaneously performing the airflow heating and the conduction heating, and adjusting the heating temperatures of the airflow heating and the conduction heating separately according to the preset adjustment amplitude.

13. The method of controlling the smoking device of claim 12, wherein in the third operation mode, when the heating temperature of the conduction heating is controlled to rise according to the control information, and the heating temperature of the airflow heating is controlled to drop at the same time.

* * * * *